US007004599B2

(12) United States Patent
Mullani

(10) Patent No.: US 7,004,599 B2
(45) Date of Patent: Feb. 28, 2006

(54) ILLUMINATED MIRROR EMPLOYING CROSS AND PARALLEL POLARIZATION

(75) Inventor: Nizar A. Mullani, Sugar Land, TX (US)

(73) Assignee: 3gen, LLC., Dana Point, CA (US)

( * ) Notice: Subject to any disclaimer, the term of this patent is extended or adjusted under 35 U.S.C. 154(b) by 101 days.

(21) Appl. No.: 10/751,326

(22) Filed: Jan. 2, 2004

(65) Prior Publication Data

US 2005/0146863 A1 Jul. 7, 2005

(51) Int. Cl.
*F21V 33/00* (2006.01)

(52) U.S. Cl. ........................ 362/139; 362/19; 362/140; 362/138; 359/493; 359/501

(58) Field of Classification Search .................. 362/19, 362/138, 139, 140, 141; 359/493, 501, 884
See application file for complete search history.

(56) References Cited

U.S. PATENT DOCUMENTS 1,774,331 A 8/1930 Koller
1,786,420 A 12/1930 Braly
2,120,365 A 6/1938 Kriebel
2,866,375 A 12/1958 Wells et al.
2,947,212 A 8/1960 Woods
3,062,087 A 11/1962 Zandman et al.
3,711,182 A * 1/1973 Jasgur ........................ 359/493
4,007,979 A 2/1977 Coblitz
4,070,096 A * 1/1978 Jasgur ......................... 362/19
4,398,541 A 8/1983 Pugliese
4,846,184 A 7/1989 Comment et al.
4,957,368 A 9/1990 Smith
4,998,818 A 3/1991 Kugler et al.
5,198,875 A 3/1993 Bazin et al.
5,343,536 A 8/1994 Groh
5,442,488 A 8/1995 Pastorino (Continued)

FOREIGN PATENT DOCUMENTS

IT 01300568 5/2000

OTHER PUBLICATIONS (Brochure) 3Gen, LLC., "First in Pocket Epiluminescence Microscopy," 1 Page, Mar. 15, 2001 (Estimated Publication Date).

(Continued)

*Primary Examiner*—Stephen F Husar
(74) *Attorney, Agent, or Firm*—Stetina Brunda Garred & Brucker

(57) ABSTRACT

The present invention relates to an illuminated personal hygiene mirror for viewing facial skin or other areas of the body. In each of the embodiments of the present invention, a hand-held frame receives and supports a mirror. The mirror is covered with a polarizer for polarizing any reflected light falling thereon. A light source is positioned within the frame about the periphery of the mirror and is covered by a polarizing filter for polarizing light emitted therefrom. The mirror polarizer and light source polarizer are out of phase providing cross-polarized light to the eye of the user. An integral handle supports the frame and is held by the user when viewing facial skin. Other embodiments of the present invention include the same components, except a two-way mirror is employed and the mirror frame has a removable back portion to allow viewing by a second person. Other embodiments include an illuminated mirror employing cross and parallel polarization using two light sources. Other embodiments incorporate the use of a mirror filter which can rotate within the frame of the mirror to provide variable polarization to the user.

97 Claims, 4 Drawing Sheets

U.S. PATENT DOCUMENTS

| | | | |
|---|---|---|---|
| 5,690,417 | A | 11/1997 | Polidor et al. |
| 5,742,392 | A | 4/1998 | Anderson et al. |
| 5,900,996 | A | 5/1999 | Zadro |
| 6,032,071 | A | 2/2000 | Binder |
| D425,313 | S | 5/2000 | Zadro |
| 6,158,877 | A | 12/2000 | Zadro |
| 6,384,988 | B1 | 5/2002 | Muller et al. |
| 6,483,247 | B1 | 11/2002 | Edwards et al. |
| 6,587,711 | B1 | 7/2003 | Alfano et al. |

OTHER PUBLICATIONS (Brochure) 3Gen, LLC., 3Gen the Beauty of Revolutionary Innovation, 3 Pages (Trifold), Feb. 15, 2002 (Estimated Publication Date).

(Internet Literature) www.syrisscientific.com,"Technical," 1 Page (Unknown Publication Date).

* cited by examiner

ILLUMINATED MIRROR EMPLOYING CROSS AND PARALLEL POLARIZATION

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

The present invention relates generally to a mirrored epiluminescence device used primarily in personal hygiene. More particularly, the invention comprises an improved mirror for illuminating the skin for personal hygiene and for examination of the skin by another person providing cross-polarized and parallel-polarized light to aid in viewing differing features of the skin.

BACKGROUND OF THE INVENTION

Personal hygiene mirrors are a part of every day life to view the face for a variety of reasons. Most significantly, personal hygiene mirrors are used for a self examination of the skin as an aid in improving personal appearance by detecting facial flaws associated with the skin. Identifying problem areas of the skin, the user can then cosmetically address the problems to self-applied hygiene products.

Common personal hygiene mirrors are typically oval or circular supported by a handle or support stand. To improve viewing of the skin, mirrors may include lights embedded within a housing surrounding the mirror to direct light upon the face to aid in viewing the skin. Illuminated mirror manufacturers have devised a variety of methods for illuminating the face of a person positioned close to the mirror. One method positions one or more light sources around the periphery of the mirror. Another approach utilizes an annular light diffuser ring that encircles a mirror in an attempt to evenly distribute the light upon the face. Other solutions include use of a ring-shaped fluorescent light that encircles the entire mirror. Various methods of illuminating mirrors are discussed in the U.S. Pat. No. 6,158,877 entitled "Magnifying Mirror Having Focused Annular illuminator", issued Dec. 12, 2000, the substance of which is incorporated herein by reference.

A problem inherent to all of the aforementioned illuminated mirrors is the glare associated with the skin's surface impeding the user from visualizing the skin in a more detailed manner. Methods used to reduce the surface reflection from the skin are known in the medical field and are generally referred to as epiluminescence imaging. Cross-polarization or orthogonal polarization is one method of reducing the reflection of the light from the surface of the skin to aid in the examination of the skin. Light emanating from a light source is first linearly polarized, so that the orientation of the light falling on the skin surface is in the same plane of polarization. As the light enters the skin, its polarization angle changes such that the light is reflected from a deeper structure. However, the light reflected from the surface of the skin is still polarized in the same plane as the incident light. By including a second polarizer in the path of the reflected light from the skin, a selective filtering of light can be achieved.

Most of the light directed to the skin's surface is reflected back to the viewer as the refractive index of skin is higher than that of air. The reflection of light, off of the skin, is analogous to the reflection of light off of the surface of water. Accordingly, the information received by the eye carries mostly information about the contour of the skin surface rather than the deeper structures. Remaining light enters the skin and is absorbed or is reflected back in a scattered fashion. By polarizing the incident light with a second of polarizer, the specular component of the reflected light is blocked by the viewing polarizer, thus producing an enhanced view below the skin surface. Accordingly, inflammation, color, pigmentation, hair follicles and blood vessels may be viewed.

When the incident light and the second polarizer are parallel, the surface topography and properties of the skin are highlighted and enhanced. In this regard, if the polarizer in the path of the light from the skin to the eye is polarized in the same orientation of the incident light, only the light from its polarization angle will be viewed. Cross-polarization imaging of the body skin was originally described by R. R. Anderson ("Polarized light examination and photography of the skin." Archives Dermatology 1991; 127; 1000–1005), the substance of which is incorporated herein by reference.

An example of constructive application of cross-polarization epiluminescence in the medical field is embodied in a device identified as DermLite®, manufactured and marketed by 3Gen, LLC. of Monarch Beach, Calif. With this low cost and easy to use DermLite® Device, screening for cancer by dermatologists in routine clinical examination of skin disease has become a reality. The DermLite® device uses cross-polarization epiluminescence imaging through use of white light emitting diodes (LEDs), a high magnification lens (10×), and a lithium ion battery contained in a small lightweight device.

In the DermLite® device, a window is incorporated into a compact housing and a plurality of white light LEDs encircle a magnifying lens. The DermLite® device incorporates cross-polarization filters that reduce the reflection of light from the surface of the skin and permits visualization of the deeper skin structures. Light from eight (8) LEDs is polarized linearly by a polarizer, which is annular in shape and located in front of the LEDs. The imaging viewed through the magnifying lens is also linearly polarized by using a polarizer that is located in front of the lens. The LEDs have a narrow beam angle that concentrates the light into a small area, pointing the incident light to the center to increase the brightness of the area being viewed. Thus, light from the LEDs passes through the polarizer which enters the skin and reflects back through the viewing polarizer to create cross-polarization allowing examination to look deeper within the skin structure. The DermLite® Platinum™ product, also manufactured by 3Gen, LLC. was developed to provide variable polarization. Variable polarization is achieved by a rotating dial. Rotation of the polarizer to a cross-polarization cancels out the surface reflection for an in-depth look at the deeper pigmentation and lesion structures. Rotation to parallel polarization allows a clear view of the skin surface. The DermLite® Pro DP-R™ also manufactured by 3gen, LLC, was developed to provide instant, button activated, polarization control. Embodiments of the DermLite® Pro DP-R™ are disclosed in U.S. patent application Ser. No. 10/384,110 filed Mar. 7, 2003, the substance of which is incorporated herein by reference. Variable mode polarization is provided by a toggle switch that allows the viewer to view the surface of the skin using a polarizing mode, and a switch creates a cross polarization which cancels out surface reflection for a view of the deeper pigmentation and structures of the skin.

Although, the DermLite®, DermLite® Platinum™ and DermLite® Pro DP-R™ products have been recognized as a major advancement in the art of routing clinical diagnosis and analysis of skin cancer lesions, the DermLite® and DermLite® Platinum™ devices do not provide a mechanism for self-examination of facial skin for cosmetic and/or medical purposes. Thus, there is a great need in the art for a mirror device that will allow self-examination of facial skin for cosmetic and/or medical purposes employing cross-polarized imaging and parallel-polarized imaging and a combination of both. Further there is a great need in the art for a mirror device for self-examination of facial skin that employs cross-polarization and parallel-polarization using epiflourescence with white light and colored or UV light in order to contrast facial skin.

BRIEF SUMMARY OF THE INVENTION

The present invention relates to an illuminated personal hygiene mirror viewing facial skin or other areas of the body. In the first embodiment, a hand-held frame receives and supports a mirror. The mirror is covered with a polarizer for polarizing any reflected light thereon. A plurality of spaced luminous diodes are positioned within the frame about the periphery of the mirror. Each of the luminous diodes have a polarized filter for polarizing light emitted from the diodes. Polarizing filter for the luminous diodes is polarized out of phase with the polarized surface of the mirror. In operation, polarized light emitted from the diode falling upon the face of the user is reflected from the mirror surface to the eye of the user as cross-polarized light. An integral handle supports the frame in the mirror to be held by the user when viewing facial skin.

A second embodiment of the present invention includes all of the components of the first embodiment, except that the mirror provided therein is a two-way mirror reflecting light back to the user, but also allowing a user situated behind the mirror to also view the subject's skin. In this regard, the frame incorporates a removable back so that the invention can operate as a hand-held mirror for a single user, or may additionally be utilized to allow a from behind the mirror viewer to also view the facial skin when the back is removed.

A third embodiment of the present invention provides a frame for receiving and supporting a mirror. The mirror incorporates a polarized surface for reflecting polarized light back to the user, said polarized surface having a first plane of polarization. A first illumination source comprises a plurality of spaced illumines diodes positioned upon the frame about the periphery of the mirror, each of the diodes having a polarizing filter having a second plane polarization. The second illuminated source is positioned within the frame, and between the diodes of the first illumination source to form an alternating series of diodes about the mirror. In operation, when polarized light falls upon the face of the user from the first illuminated source, it is reflected from the polarized mirror to the eye of the user as cross-polarized light, and non-polarized light falling on the face of the user from the second illumination source is reflected from the polarized mirror to the eye of the user as polarized light. The mirror of the third embodiment further comprises a switch having a first mode for initiating the first illumination source, a second mode for initiating a second illumination source and a third mode for initiating said first and second illumination sources simultaneously. It is contemplated by the third embodiment of the present invention that the first luminous diodes and second luminous diodes of the first and second illumination sources each have differing color wave lengths. Further, where the light of different colored wave lengths are utilized, the filter may be optionally used.

The fourth embodiment of the present invention includes all the components of the third embodiment of the present invention except that the mirror is a two-way mirror reflecting light back to the user, as well as allowing the viewer behind the mirror to view the surface of the user's skin. In this regard, the frame includes a removable back that allows the mirror to be used as a one-way mirror when the back is inserted into the frame, and as a two-way mirror when the back is removed.

In a fifth embodiment of the present invention, all the components of the first embodiment are employed, except that the light source is comprised of a circular fluorescent tube. In a sixth embodiment, all of the components of the fifth embodiment are incorporated except that the mirror is two-way mirror, and that the mirror frame has a removable back to allow viewing from the rear of the mirror.

In a seventh embodiment, all the of the components of the first embodiment are employed but the polarized mirror is rotationally positionable within the frame such that the polarization of the mirror and the polarized light source, may be aligned in either a parallel or orthogonal relationship. A small handle protrudes from the side of the frame to allow movement of the polarized mirror for the selected polarization. The eighth embodiment, is structurally identical to the seventh embodiment except that the mirror employed is a two-way mirror for reflection on the front of the mirror, and viewing from behind the mirror. Accordingly, the mirror frame has a removable backing that allows the mirror to be used conventionally, or with a viewer positioned behind the mirror.

BRIEF DESCRIPTION OF THE DRAWINGS

Features of the present invention will become more apparent upon reference to the drawings wherein.

DETAILED DESCRIPTION OF THE INVENTION

The detailed description as set forth below in connection with the appended drawings is intended as a description of the presently preferred embodiments of the present invention, and does not represent the only embodiment of the present invention. It is understood that various modifications to the invention may be comprised by different embodiments and are also encompassed within the spirit and scope of the present invention.

Figure 1:
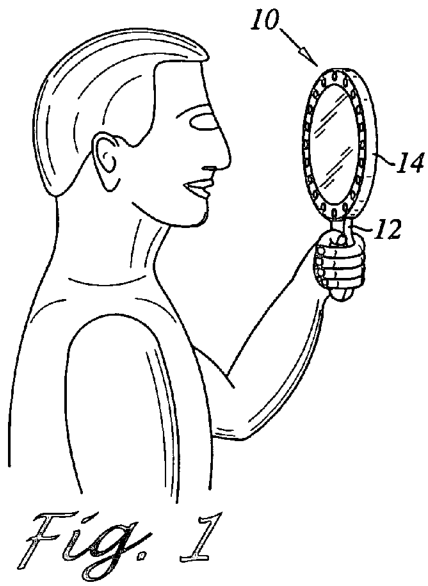
FIG. 1 shows the illuminated mirror device of the present invention being held by a user.

Referring particularly to FIGS. 1–4 there is shown a first embodiment of the illuminated personal hygiene mirror of the present invention. In FIG. 1, the illuminated mirror 10 is shown with the user grasping a handle 12 which is interconnected to a mirror frame 14. In the first embodiment of the present invention, while the illuminated mirror 10 includes integrally formed handle 12, it is additionally contemplated in this embodiment, and others described herein that the handle 12 may be detachable, or alternatively replaced with a mirror stand or wall attachment.

Figure 2:
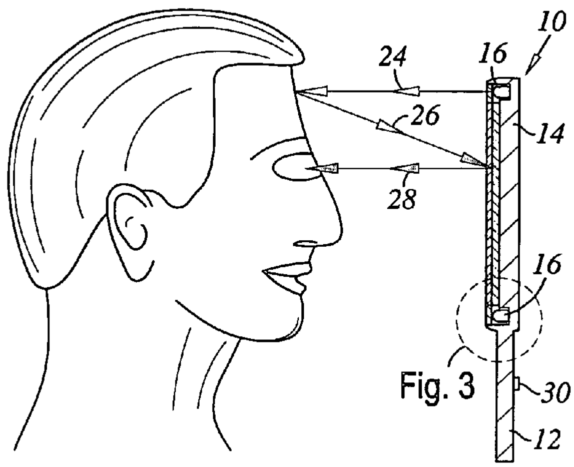
FIG. 2 shows a cross-sectional view of the illuminated mirror device of the present invention showing emitted and reflected light reaching the eye of the user.

FIG. 2 shows a cross-sectional view of the illuminated mirror 10. A plurality of luminous diodes 16 encircle a mirror 18 and a polarizing filter 20 having a first plane of polarization completely covers the mirror 18 so that any light reflected from the mirror 18 is polarized in a first plane. Each of the luminous diodes 16 are covered by a polarizing filter 22 wherein the polarizing filter 22 has a polarization that has a second plane of polarization. In this regard, light emitted from the luminous diodes 16 through the filter 22 is emitted in a second plane of polarization.

Figure 3:
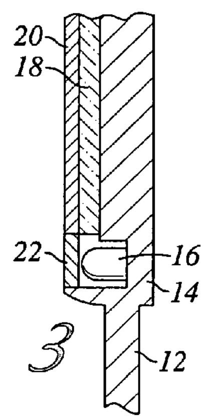
FIG. 3 is a cross-sectional view of a portion of the illuminated mirror device of the present invention as shown in FIG. 2.

In operation, and referring particularly to FIGS. 2 and 3, light is emitted from a luminous diode 16 which passes through filter 22 providing polarized light 24. Luminous diodes 16 are shown, however, it is contemplated by all embodiments that the illumination source could be an incandescent light, a fluorescent light, a series of incandescent lights, a single incandescent light having a light diffuser, a ring fluorescent tube or fiber optics. It is also contemplated with respect to all embodiments that a single light source in the handel positioned to direct light on the user's face may be employed. Also two singular light sources may be used.

Reflected light from the user's skin 26 is cross-polarized by reflecting from the mirror 18 through the mirror polarizer 20 to provide cross-polarized reflection light 28 to the eye of the user. In this regard, polarized light from the diodes 16 falling upon the face of the user is reflected from the polarized mirror (18 and 22 in combination) to the eye of the user as cross-polarized light. It is contemplated that the respective planes of polarization of the filter 22 and filter 20 are in orthogonal relationship providing cross-polarized light. It is additionally contemplated by the present invention that the polarized filters 22 and 20 could be in parallel polarization providing a parallel polarized light to the eye of the user. It is further contemplated by the present invention that the respective plane polarization between the filters 22 and filter 20 are not orthogonal or parallel, but may range from 0 to 90 degrees. It is additionally contemplated in this embodiment, and other described herein that the various filters may be colored filters providing differing views. A switch 30 is provided to allow the manual initiation of the luminous diodes to either on or off positions.

Figure 4:
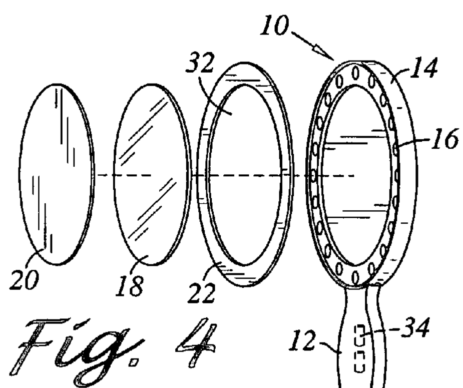
FIG. 4 is an exploded view of the components of the illuminated mirror device of the present invention.

Referring particularly to FIG. 4 an exploded view of luminous mirror 10 is shown. A filter 20 is sized and configured to cover a mirror 18 which is positioned within the frame 14 of the luminous mirror 10. A light source comprising a plurality of luminous diodes 16 are positioned upon the frame about the periphery of the mirror 18 to direct light upon the face of the user. A ringed planar filter 22 defining a center opening 32 is positioned in corresponding alignment with the mirror 18 when it is placed in the frame 14. Accordingly, the ring filter 22 does not interfere with the reflected light from the mirror 18 and is provided to polarize light emitted from the luminous diodes 16. It is contemplated by the present invention that in this embodiment and others described herein the luminous diodes may be powered from a variety of sources, however, as shown in FIG. 4 batteries 34 are shown in phantom within the handle 12 of the illuminated mirror 10. White LEDs made with phosphorescence phosphors to create white light are preferable. It is additionally contemplated by the present invention in this embodiment and others described herein that tri-color LEDs, with individual red, green, and blue LEDs can combine to form white light may be utilized as well. It is contemplated by the present invention and with respect to each of the embodiments that the LEDs may have focused lenses to concentrate light into a smaller and tighter beam. The LEDs may additionally be comprised of indium gallium arsenide material, or any other like semiconductor material. Further, the LEDs can be a combination of white light LEDs and UV/blue LEDs. The UV/blue LEDs can provide fluorescence imaging which provides functional information about skin structure, while white light provides anatomical information.

The mirror 18 as contemplated by the present invention, is a flat mirror with a polarizing filter 20 affixed to the surface of mirror 18. The filter 20 lays over the mirror 18 and is held in place by the frame 14. It is contemplated, in this embodiment and others described herein that the filter 20 could be a coating on the mirror 18. The mirror 18 is contemplated to be a flat reflecting mirror. It is additionally contemplated that the mirror 18 in this embodiment and in all embodiments described herein, could be magnified having a curved surface for purposes of magnification. It is additionally contemplated that the mirror 18 in this embodiment and in all embodiments described herein, could be a variable magnifying mirror which provide varying degrees of magnification. It is also contemplated in this embodiment and others described herein that a magnifying lens could be incorporated in the viewing area to provide magnification.

Figure 5:
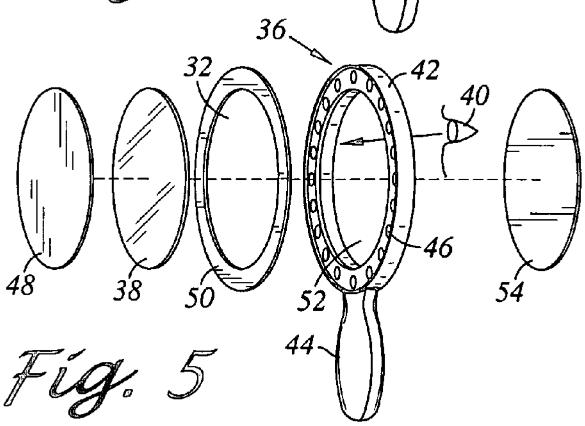
FIG. 5 represents an exploded view of the illuminated two-way mirror device of a second embodiment of the present invention.

Referring particularly to FIG. 5, there is shown a second embodiment of the present invention. The second embodiment of the present invention, as shown in FIG. 5, shows an illuminated mirror 36 that employs each of the components of the first embodiment, except that a two-way mirror 38 is used. The two-way mirror 38 provides reflection to the user, as with a one-way mirror, but additionally permits viewing of the user's skin by a second person 40 for viewing the skin from behind the mirror 38. In this regard, a frame 42 provides a series of luminous diodes 46 and integral handle 44. The two-way mirror 38 is received within the frame 42 and the mirror 38 is covered by a filter 48 having a first plane of polarization. Ring filter 50 having a second plane of polarization is provided to polarize light emitted from the ring of luminous diodes 46. The mirror filter 48 is affixed to the reflecting side of the two-way mirror 38. The frame 42 includes an aperture 52 for receiving and supporting the mirror 38 and filter 48 within the frame 42. A removable cover 54 may be inserted into the aperture 42 to cover the back of the two-way mirror 38 when a second person is not involved in the viewing of the user's skin. In this regard, the removable cover 54 can be releaseably engaged with the frame 42. As in the first embodiment, the light from the diodes 46 is polarized by the filter 50 and falls upon the user's skin and is reflected back to the user's eye from the polarized mirror 76 as cross-polarized light.

Figure 6:
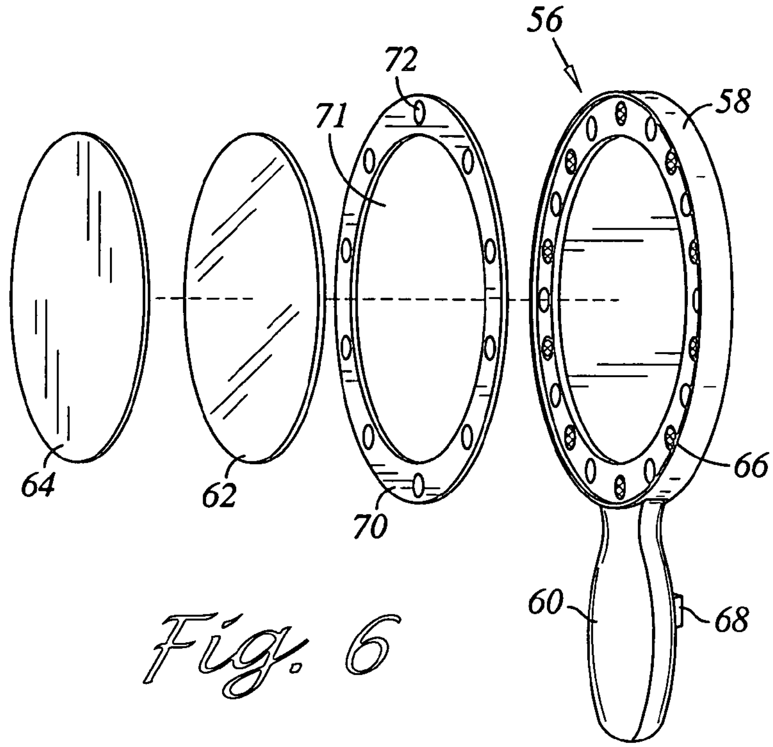
FIG. 6 is an exploded view of a third embodiment of the two light source illuminated mirror device of the present invention.

Referring particularly to FIG. 6, there is shown a third embodiment of the present invention. The third embodiment comprises a two illumination source mirror 56. The mirror 56 has a frame 58 and integral handle 60. The frame is adapted to receive a mirror 62 which is covered by a polarizing filter 64 having a first plane of polarization. The filter 64 and the mirror 62 are nestled within the frame 58 proximal to a ring of luminous diodes 66. The even luminous diodes are on a first electrical circuit, and are illuminated by a switch 68. The odd diodes are on a separate single circuit and additionally operable by switch 68. Thus, engaging this switch 68 initiates a first light source, which are the even diodes, and the same switch can initiate the second light source which are the odd diodes. The switch may additionally operate both the even and the odd diodes simultaneously. A polarizing filter 70 comprises a planar annular ring defining a generally circular center opening 71 and an outer ring. The center opening 71 of the annular ring 70 is positioned in alignment with the mirror 62 and filter 64 to provide an unobstructed view of reflected light from the mirror 62 to the user. The outer ring of the polarizer 70 includes a plurality of openings 72 sized and positioned to correspond to the luminous diodes of the second illumination source (i.e. every other diode of the second light circuit) such that light emitted from the luminous diodes 66 on the second illumination source passes through the openings unfiltered by the polarizer 70. Because there are no corresponding openings for the diodes of the first illumination source (i.e. every other diode on the first light circuit) light emitted from the first light diode is polarized by the polarizer 70. In this regard, a user can toggle between cross-polarized light and polarized light. Both sets of LEDs are preferably white light output indium gallium nitride LEDs, however, any suitable lighting diodes are appropriate. The alternating diodes can be alternating which light and UV/blue light diodes. Lighting the UV/blue light image with the standard white light image, the user can use a "flicker" method of imaging to notice contrasting views of the skin. It is additional contemplated any two sets of LEDs used within the first illumination source and the second illumination source may have different color wave lengths.

Figure 7:
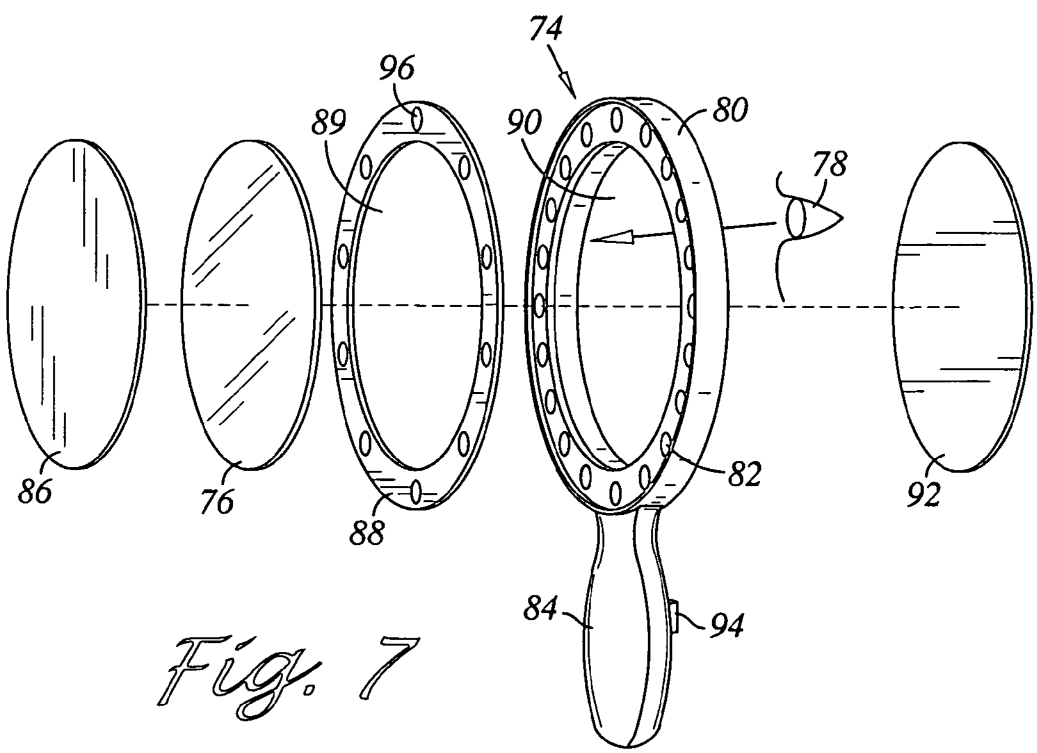
FIG. 7 is an exploded view of the two light source illuminated two-way mirror device of a fourth embodiment of the present invention.

Referring particularly in FIG. 7, there is shown a fourth embodiment of the present invention. The fourth embodiment of the present invention shows an illuminated mirror 74 employing each of the components of the third embodiment, but a two-way mirror 76 is used. A two-way mirror 76 provides reflection to the user, as with a one-way mirror, but additionally permits viewing of the user's skin by a second person 78 for viewing the skin from behind the mirror 76. In this regard, a frame 80 provides a series of luminous diodes 82 and integral handle 84. The two-way mirror 76 is received within the frame 80 and the mirror 76 is covered by a filter 86. A ring filter 88 is provided to polarize light emitted from the ring of luminous diodes 82. The mirror filter 86 is affixed to the reflecting side of two-way mirror 76. The frame 80 includes an aperture 90 for receiving and supporting the mirror 76 and filter 86 within the frame 80. A removable cover 92 may be inserted into the aperture 90 to cover the back of the two-way mirror 76 when a second person is not involved in viewing the user's skin. In this regard, the removable cover 92 can be releasably engaged within the frame 80.

The fourth embodiment, there are two illumination sources namely the even luminous diodes on a first electrical circuit which are illuminated by switch 94. The odd diodes are on a separate single circuit, and are additionally operable by switch 94. The switch may additionally operate both odd and even diodes simultaneously. The polarizing filter 88 is an annular ring defining a generally circular center opening 89 and an outer ring. The center opening 89 of the annular ring filter 88 as positioned in alignment with the mirror 76 in filter 86 to provide unobstructed reflected light from the mirror 62 to the user. The outer ring of polarizer 88 includes a plurality of openings 96 sized and positioned to correspond with the luminous diodes of the second illumination source (i.e. every other diode of the second light source) such that light emitted from the luminous diodes 82 on the second illumination source passes through the openings unfiltered by the polarizer 88. Because there are no corresponding openings for the diodes of the first illumination source (i.e. every other diode on the first light circuit) light emitted from the first light diode is polarized by polarizer 88. In this regard, a user can toggle between cross-polarized light and polarized light. Both sets of LEDs are preferably white high output indium gallium nitrite LEDs, however any suitable lighting diodes are appropriate. The alternating diodes can be alternating white light and UV/blue diodes. Lighting using the UV/blue light image with a white light image, a user can use a "flicker" method of imaging to notice contrasting views of the skin. It is additionally contemplated any two sets of LEDs used with the illumination source of the second illumination source may have different color wave lengths.

Figure 8:
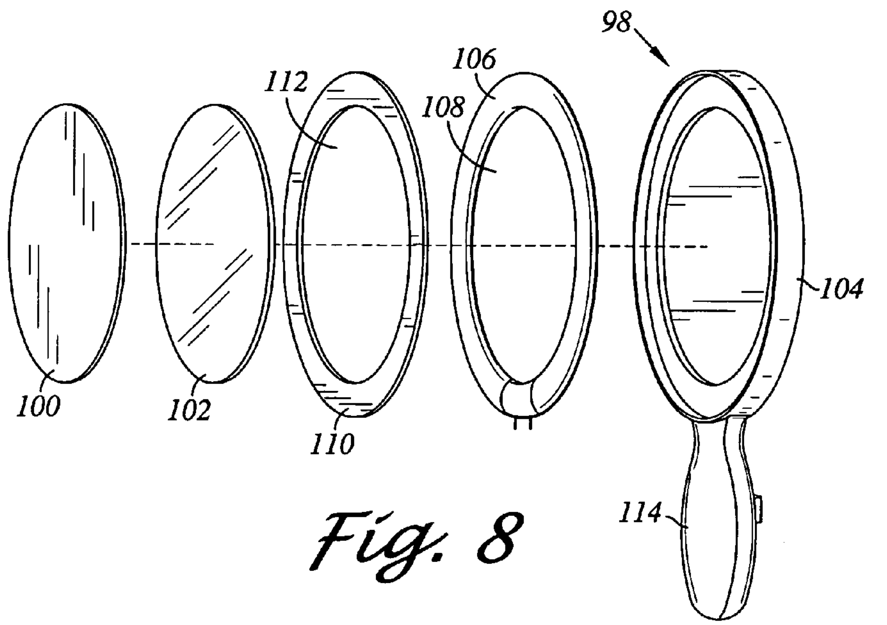
FIG. 8 is an exploded view of a fifth embodiment of the fluorescent tube illuminated mirror device of the present invention.

Referring particularly to FIG. 8, there is shown a fifth embodiment of the present invention showing an alternative light source utilized. In FIG. 8, an exploded view of a luminous mirror 98 is shown. A filter 100 is sized and configured to cover a mirror 102 which is positioned within the frame 104 of the luminous mirror 98. A light source, namely a circular fluorescent light 106 is sized to fit within the frame 104 and has a center opening 108 sized to run about the periphery of the mirror 102 and filter 100 combination, to direct light upon the face of the user. A ringed planar filter 110 defining a center opening 112 is positioned in corresponding alignment with the mirror 102 when it is placed within the frame 104 such that the ring filter 110 does not interfere with reflected light from the mirror 102 and is provided to polarize light emitted from the fluorescent tube 106. It is contemplated by the present invention that the fluorescent light may be powered from a variety of sources, however, preferably by a battery source.

The polarized filter 100 is affixed to the surface of the mirror 102. The filter 100 lays over the mirror 102 and is held in place by frame 104. It is contemplated however, that the filter 100 could be a coating on the mirror 102. The mirror 102 is contemplated to be a flat reflecting mirror. It is additionally contemplated that the mirror could be magnified having a curved surface for purposes of magnification. It is additionally contemplated that the mirror 102, in this embodiment and all other embodiments described herein, could be magnified having a curved surface for purposes of magnification. It is additionally contemplated that the mirror 102, in this embodiment and all others described herein, could be a variable magnifying mirror which provides varying degrees of magnification. It is additionally contemplated by this embodiment as other embodiments herein, that a magnifying lens could be incorporated in the view area of the mirror to provide magnification.

An integrally formed handle 114 is attached to the frame 104. Although the handle 114 is integrally formed with the frame 104, it is contemplated by this embodiment, and other embodiments described herein, that the handle 114 may be detachable, or alternatively replaced with a mirror stand or wall attachment.

Figure 9:
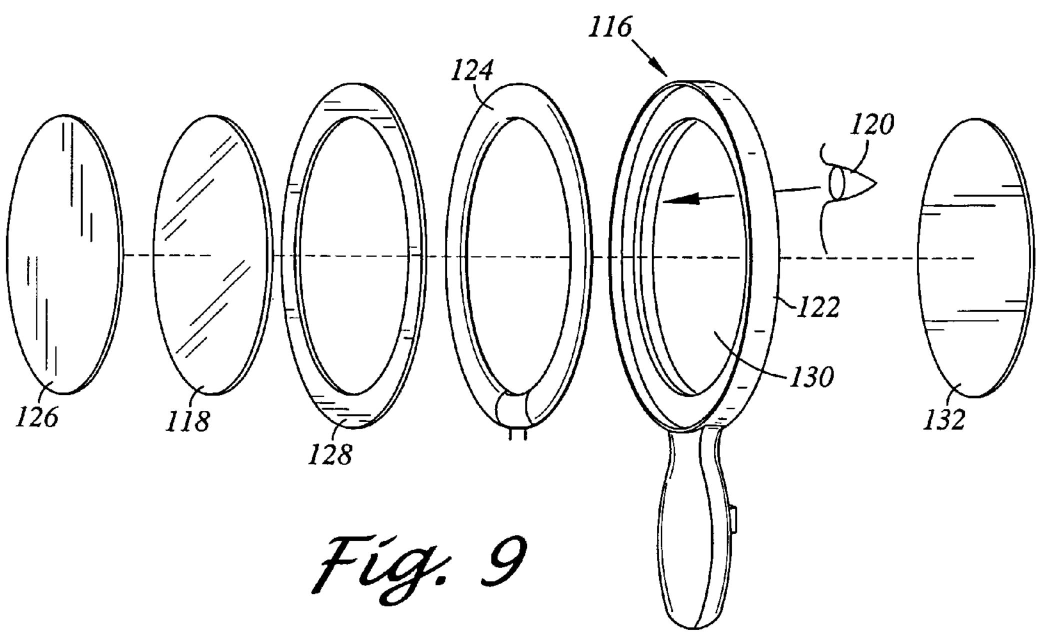
FIG. 9 is an exploded view of a sixth embodiment of the fluorescent tube illuminated two-way mirror device of the present invention.

Referring particularly to FIG. 9, there is shown a sixth embodiment of the present invention. FIG. 9 represents an exploded view of the illuminated mirror 116. FIG. 9 shows the sixth embodiment employing each of the components of the fifth embodiment but a two-way mirror 118 is used. The two-way mirror 118 provides reflection to the user, as with a one-way mirror, but additionally permits viewing of the user's skin by a second person 120 for viewing the skin from behind the mirror 118. In this regard, a frame 122 provides support for fluorescent tube 124. The two-way mirror 118 is received within the frame 122 and the mirror 118 is covered by a filter 126 having a first plane of polarization. Ring filter 128 having a second plane of polarization is provided to polarize light emitted from the fluorescent ring 124. The mirror filter 126 is affixed to the reflecting side of the two-way mirror 118. The frame 122 includes an aperture 130 for receiving and supporting two-way mirror 118 and filter 126 within the frame 122. A removable cover 132 may be inserted into the aperture 130 to cover the back of the two-way mirror 118 when a second person is not involved in the viewing of the user's skin. In this regard, the removable cover 132 can be releasably engaged with the frame 122. As in the fifth embodiment, the light from the fluorescent tube 124 is polarized by filter 128, and the polarized light falls upon the user's skin and is reflected back to the user's eye from the polarized mirror 118 as cross-polarized light.

Figure 10:
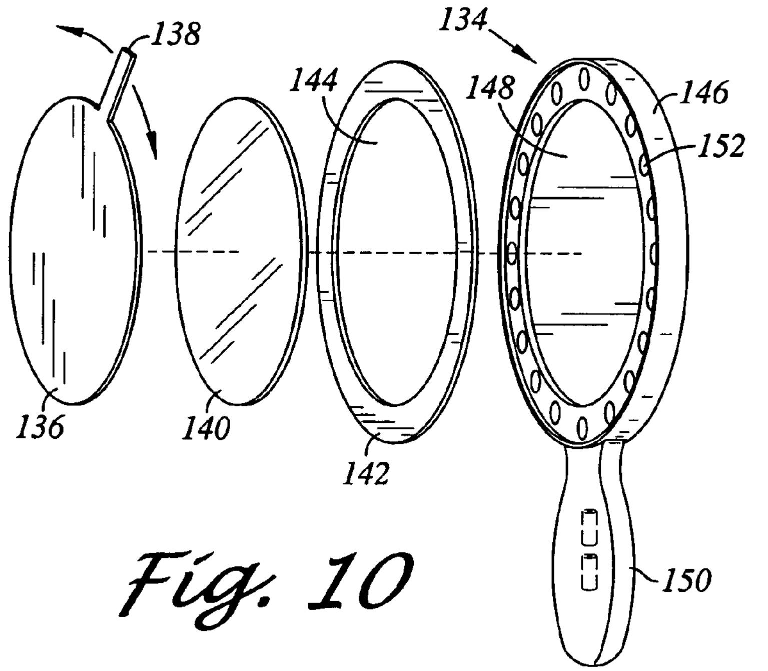
FIG. 10 is an exploded view of a seventh embodiment of the variable polarization illuminated mirror device of the present invention employing variable polarization.

Referring particularly to FIG. 10, there is shown a seventh embodiment of the present invention, namely an exploded view of an illuminated mirror 134. A filter 136 is sized and configured to cover a mirror 140 which is positioned within the frame 146 of the luminous mirror 134. A light source comprising a plurality of luminous diodes 152 is positioned about the periphery of the mirror 140 directing light upon the face of the user. A ringed planar filter 142 defining a center opening 144 is positioned in corresponding alignment with the mirror 140 when it is placed in the frame 146. Accordingly, the ringed filter 142 does not interfere with the reflected light from the mirror 140 and provides polarized light emitted from the luminous diodes 152. It is contemplated by the present invention that the luminous diodes may be powered by a variety of sources, however, as shown in FIG; 10, batteries are shown in phantom within the handle 150 of the illuminated mirror 134. Polarizing filter 136 has a first plane of polarization, and completely covers the mirror 140 so that any light reflected from the mirror 140 is polarized in the first plane. Each of the luminous diodes 152 is covered by the polarizing filter 142 wherein the polarizing filter 142 has a polarization that has a second plane of polarization. In this regard, light emitted from the luminous diodes 152 through the filter 142 is emitted in a second plane of polarization.

In operation, and referring particularly to FIG. 10, light is emitted from luminous diodes 152 which passes through the filter 142 providing polarized light. Reflected light from the user's skin is cross-polarized by reflecting from the mirror 140 through the mirror polarizer 136 to provide cross-polarized reflection light to the eye of the user, when the polarizer 136 is within a first position. The polarizing filter 136 is rotably positionable within the frame 146 such that the filter may be rotated to reflect orthogonal polarization relative to the ring filter 142 when in the first position or parallel polarization with respect to the ring filter 142 when placed in a second position. In this regard, the user can grasp handle 138 to manually rotate the filter 136 within the frame to provide variable degrees of polarization. It is contemplated by the present invention that the filter 136 could be rotated from orthogonal polarization to parallel polarization, and all modes of polarization there between.

Figure 11:
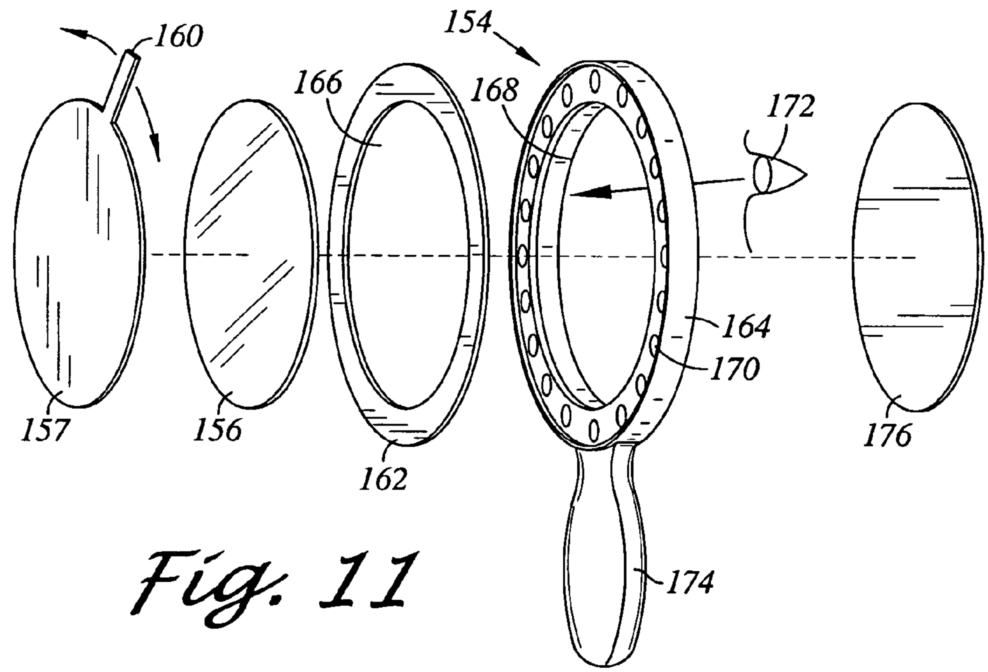
FIG. 11 is an exploded view of an eighth embodiment of the variable polarization illuminated two-way mirror device of the present invention employing variable polarization.

Referring particularly to FIG. 11, there is shown an eighth embodiment of the present invention, shown in exploded view. The eighth embodiment of the present invention as shown in FIG. 11 shows an illuminated mirror 154 that employs each of the components of the seventh embodiment, but a two-way mirror 156 is used. The two-way mirror 156 provides reflection to the user as with the one-way mirror, but additionally permits viewing of the user's skin by a second person 172 for viewing the skin from behind the mirror 156. In this regard, a frame 164 provides a series of luminous diodes 170. The two-way mirror 156 is received within the frame 164 and the mirror 156 is covered by a filter 158 having a first plane of polarization, when in a first position. Ring filter 162 having a second plane of polarization is provided to polarize light emitted from the ring of luminous diodes 170. The mirror filter 158 is affixed to the reflecting side of the two-way mirror 156. The frame 164 includes an aperture 168 for receiving and supporting the mirror 156 and filter 158 within the frame 164. A removable cover 156 may be inserted into the aperture 168 to cover the back of the two-way mirror 156 when a second person is not involved with the viewing of the user's skin. In this regard, a removable cover 176 can be releasably engaged within the frame 164. As in the seventh embodiment, light from the diodes 170 is polarized by ring filter 162 and falls upon the user's skin and is reflected back to the user's eye from the polarized mirror 156 as cross-polarized light when the filter 158 is in a first position. The filter 158 may be rotatably positionable within the frame 164 by manual manipulation of a handle 160. In this regard, the manual manipulation of the filter 158 can provide orthogonal polarization when placed in the first position through parallel polarization when placed in the second position and all modes of polarization there between.

It should be noted and understood that with respect to the embodiments of the present invention, the materials suggested may be modified or substituted to achieve the general overall resultant high efficiency. The substitution of materials or dimensions remains within the spirit and scope of the present invention.

I claim:

1. An illuminated personal hygiene mirror comprising:

(a) a polarized image reflecting surface comprising a two-way mirror having a reflecting side and a viewing side, wherein said reflecting includes a polarization filter having a first plane of polarization;

(b) at least one polarized illumination source positioned relative to the polarized reflecting surface for directing polarized light upon the face of a user, said polarized illumination source having a second plane of polarization;

(c) wherein polarized light falling upon the face of the user is reflected from the polarized image reflecting surface to the eye of user as cross-polarized light.

2. The illuminated personal hygiene mirror of claim 1 wherein the respective planes of polarization of the first and second planes of polarization are in orthogonal relationship.

3. The illuminated personal hygiene mirror of claim 1 wherein the respective planes of polarization of the first and second planes of polarization may vary in the range of 0 to 90 degrees.

4. The illuminated personal hygiene mirror of claim 1 wherein the polarized image reflecting surface is rotationally positionable within the frame such that the respective planes of polarization of the first and second planes of polarization may be aligned in either a parallel or orthogonal relationship.

5. The illuminated personal hygiene mirror of claim 1 wherein the polarized image reflecting surface is rotationally positionable within the frame such that the respective planes of polarization of the first and second planes of polarization may vary in the range of 0 to 90 degrees.

6. The illuminated personal hygiene mirror of claim 1 further comprising a frame for receiving and supporting said polarized image reflecting surface wherein said frame includes an aperture for receiving said two-way mirror, said reflecting side facing the user and allowing viewing of the cross-polarized light upon the face of the user by a second person through the viewing side.

7. The illuminated personal hygiene mirror of claim 6 wherein a removable cover is releasably insertable into said aperture to cover the viewing side of said two-way mirror when placed in said frame.

8. The illuminated personal hygiene mirror of claim 1 wherein the two-way mirror is flat.

9. The illuminated personal hygiene mirror of claim 1 wherein the two-way mirror is a magnified mirror.

10. The illuminated personal hygiene mirror of claim 1 wherein said at least one polarized illumination source is an incandescent light having a polarizing filter.

11. The illuminated personal hygiene mirror of claim 1 wherein said at least one polarized illumination source is a fluorescent light having a polarizing filter.

12. The illuminated personal hygiene mirror of claim 1 wherein said at least one polarized illumination source is a fluorescent ring light having a polarizing filter.

13. The illuminated personal hygiene mirror of claim 1 wherein said at least one polarized illumination source is a series of spaced incandescent lights positioned about the periphery of the polarized image reflecting surface, each of said incandescent lights having a polarizing filter.

14. The illuminated personal hygiene mirror of claim 1 further comprising a frame for receiving and supporting said polarized image reflection surface wherein said frame has an integrally formed handle.

15. An illuminated personal hygiene mirror comprising:

(a) a polarized image reflecting surface comprising a variable magnifying mirror having a polarizing filter affixed to the surface;

(b) at least one polarized illumination source positioned relative to the polarized reflecting surface for directing polarized light upon the face of a user, said polarized illumination source having a second plane of polarization; and (c) wherein polarized light falling upon the face of the user is reflected from the polarized image reflecting surface to the eye of user as cross-polarized light.

16. The illuminated personal hygiene mirror of claim 15 wherein the respective planes of polarization of the first and second planes of polarization are in orthogonal relationship.

17. The illuminated personal hygiene mirror of claim 15 wherein the respective planes of polarization of the first and second planes of polarization may vary in the range of 0 to 90 degrees.

18. The illuminated personal hygiene mirror of claim 15 wherein the polarized image reflecting surface is rotationally positionable within the frame such that the respective planes of polarization of the first and second planes of polarization may be aligned in either a parallel or orthogonal relationship.

19. The illuminated personal hygiene mirror of claim 15 wherein the polarized image reflecting surface is rotationally positionable within the frame such that the respective planes of polarization of the first and second planes of polarization may vary in the range of 0 to 90 degrees.

20. The illuminated personal hygiene mirror of claim 15 wherein said polarized reflecting surface is a two-way mirror having a reflecting side with a polarizing filter affixed to the surface of said reflecting side and a viewing side.

21. The illuminated personal hygiene mirror of claim 20 further comprising a frame for receiving and supporting said polarized image reflecting surface wherein said frame includes an aperture for receiving said two-way mirror, said reflecting side facing the user and allowing viewing of the cross-polarized light upon the face of the user by a second person through the viewing side.

22. The illuminated personal hygiene mirror of claim 20 wherein a removable cover is releasably insertable into said aperture to cover the viewing side of said two-way mirror when placed in said frame.

23. The illuminated personal hygiene mirror of claim 20 wherein the polarized image reflecting surface is a flat two-way mirror.

24. The illuminated personal hygiene mirror of claim 20 wherein the polarized image reflecting surface is a magnified two-way mirror.

25. The illuminated personal hygiene mirror of claim 15 wherein said at least one polarized illumination source is an incandescent light having a polarizing filter.

26. The illuminated personal hygiene mirror of claim 15 wherein said at least one polarized illumination source is a florescent light having a polarizing filter.

27. The illuminated personal hygiene mirror of claim 15 wherein said at least one polarized illumination source is a ring florescent light having a polarizing filter.

28. The illuminated personal hygiene mirror of claim 15 wherein said at least one polarized illumination source is a series of spaced incandescent lights positioned about the periphery of the polarized image reflecting surface, each of said incandescent lights having a polarizing filter.

29. The illuminated personal hygiene mirror of claim 15 wherein said at least one polarized illumination source is a series of spaced luminous diodes positioned about the periphery of the polarized image reflecting surface, each of said luminescent diodes having a polarizing filter.

30. The illuminated personal hygiene mirror of claim 15 wherein said at least one polarized illumination source is a series of spaced luminous diodes positioned about the periphery of the polarized image reflecting surface and a planar filter defining a center opening and an outer edge, said center opening positioned in corresponding alignment with the polarized image reflecting surface to provide an unfiltered view thereof and said outer edge positioned in corresponding alignment with said luminous diodes to provide polarized light.

31. The illuminated personal hygiene mirror of claim 15 further comprising a frame for receiving and supporting said polarized image reflection surface wherein said frame has an integrally formed handle.

32. An illuminated personal hygiene mirror comprising:

(a) A polarized image reflecting surface having a first plane of polarization:

(b) at least one luminous diode having a polarizing filter with a second plane of polarization positioned relative to the polarized reflecting surface for directing polarized light upon the face of the user; and (c) wherein polarized light falling upon the face of the user is reflected from the polarized image reflecting surface to the eye of user as cross-polarized light.

33. The illuminated personal hygiene mirror of claim 32 wherein the respective planes of polarization of the first and second planes of polarization are in orthogonal relationship.

34. The illuminated personal hygiene mirror of claim 32 wherein the respective planes of polarization of the first and second planes of polarization may vary in the range of 0 to 90 degrees.

35. The illuminated personal hygiene mirror of claim 32 wherein the polarized image reflecting surface is rotationally positionable within the frame such that the respective planes of polarization of the first and second planes of polarization may be aligned in either a parallel or orthogonal relationship.

36. The illuminated personal hygiene mirror of claim 32 wherein the polarized image reflecting surface is rotationally positionable within the frame such that the respective planes of polarization of the first and second planes of polarization may vary in the range of 0 to 90 degrees.

37. The illuminated personal hygiene mirror of claim 32 wherein said polarized reflecting surface is a two-way mirror having a reflecting side with a polarizing filter affixed to the surface of said reflecting side and a viewing side.

38. The illuminated personal hygiene mirror of claim 37 further comprising a frame for receiving and supporting said polarized image reflecting surface wherein said frame includes an aperture for receiving said two-way mirror, said reflecting side facing the user and allowing viewing of the cross-polarized light upon the face of the user by a second person through the viewing side.

39. The illuminated personal hygiene mirror of claim 37 wherein a removable cover is releasably insertable into said aperture to cover the viewing side of said two-way mirror when placed in said frame.

40. The illuminated personal hygiene mirror of claim 37 wherein the polarized image reflecting surface is a flat two-way mirror.

41. The illuminated personal hygiene mirror of claim 37 wherein the polarized image reflecting surface is a magnified two-way mirror.

42. The illuminated personal hygiene mirror of claim 32 wherein said at least one polarized luminous diode includes a series of spaced luminous diodes positioned about the periphery of the polarized image reflecting surface, each of said luminescent diodes having a polarizing filter.

43. The illuminated personal hygiene mirror of claim 32 wherein said at least one polarized luminous diode includes diodes positioned about the periphery of the polarized image reflecting surface and a planar filter defining a center opening and an outer edge, said center opening positioned in corresponding alignment with the polarized image reflecting surface to provide an unfiltered view thereof and said outer edge positioned in corresponding alignment with said luminous diodes to provide polarized light.

44. The illuminated personal hygiene mirror of claim 32 further comprising a frame for receiving and supporting said polarized image reflection surface wherein said frame has an integrally formed handle.

45. An illuminated personal hygiene mirror comprising:

(a) a polarized image reflecting surface having a first plane of polarization;

(b) a series of spaced luminous diodes positioned about the periphery of the polarized image reflecting surface, each of said luminescent diodes having a polarizing filter, the luminous diodes positioned relative to the polarized reflecting surface for directing polarized light upon the face of a user, said polarized illumination source having a second plane of polarization; and (c) wherein polarized light falling upon the face of the user is reflected from the polarized image reflecting surface to the eye of user as cross-polarized light.

46. The illuminated personal hygiene mirror of claim 45 wherein the respective planes of polarization of the first and second planes of polarization are in orthogonal relationship.

47. The illuminated personal hygiene mirror of claim 45 wherein the respective planes of polarization of the first and second planes of polarization may vary in the range of 0 to 90 degrees.

48. The illuminated personal hygiene mirror of claim 45 wherein the polarized image reflecting surface is rotationally positionable within the frame such that the respective planes of polarization of the first and second planes of polarization may be aligned in either a parallel or orthogonal relationship.

49. The illuminated personal hygiene mirror of claim 45 wherein the polarized image reflecting surface is rotationally positionable within the frame such that the respective planes of polarization of the first and second planes of polarization may vary in the range of 0 to 90 degrees.

50. The illuminated personal hygiene mirror of claim 45 wherein said polarized reflecting surface is a two-way mirror having a reflecting side with a polarizing filter affixed to the surface of said reflecting side and a viewing side.

51. The illuminated personal hygiene mirror of claim 50 further comprising a frame for receiving and supporting said polarized image reflecting surface wherein said frame includes an aperture for receiving said two-way mirror, said reflecting side facing the user and allowing viewing of the cross-polarized light upon the face of the user by a second person through the viewing side.

52. The illuminated personal hygiene mirror of claim 50 wherein a removable cover is releasably insertable into said aperture to cover the viewing side of said two-way mirror when placed in said frame.

53. The illuminated personal hygiene mirror of claim 50 wherein the polarized image reflecting surface is a flat two-way mirror.

54. The illuminated personal hygiene mirror of claim 50 wherein the polarized image reflecting surface is a magnified two-way mirror.

55. The illuminated personal hygiene mirror of claim 45 wherein a planar filter defines a center opening and an outer edge, said center opening positioned in corresponding alignment with the polarized image reflecting surface to provide an unfiltered view thereof and said outer edge positioned in corresponding alignment with said luminous diodes to provide polarized light.

56. The illuminated personal hygiene mirror of claim 45 further comprising a frame for receiving and supporting said polarized image reflection surface wherein said frame has an integrally formed handle.

57. An Illuminated personal hygiene mirror comprising:
(a) a polarized image reflecting surface having a first plane of polarization;
(b) a series of spaced luminous diodes positioned about the periphery of the polarized image reflecting surface and a planar filter defining a center opening and an outer edge, said center opening positioned in corresponding alignment with the polarized image reflecting surface to provide an unfiltered view thereof and said outer edge positioned in corresponding alignment with said luminous diodes to provide polarized light the luminous diodes positioned relative to the polarized reflecting surface for directing polarized light upon the face of a user, said polarized illumination source having a second plane of polarization; and
(c) wherein polarized light falling upon the face of the user is reflected from the polarized image reflecting surface to the eye of user as cross-polarized light.

58. The illuminated personal hygiene mirror of claim 57 wherein the respective planes of polarization of the first and second planes of polarization are in orthogonal relationship.

59. The illuminated personal hygiene mirror of claim 57 wherein the respective planes of polarization of the first and second planes of polarization may vary in the range of 0 to 90 degrees.

60. The illuminated personal hygiene mirror of claim 57 wherein the polarized image reflecting surface is rotationally positionable within the frame such that the respective planes of polarization of the first and second planes of polarization may be aligned in either a parallel or orthogonal relationship.

61. The illuminated personal hygiene mirror of claim 57 wherein the polarized image reflecting surface is rotationally positionable within the frame such that the respective planes of polarization of the first and second planes of polarization may vary in the range of 0 to 90 degrees.

62. The illuminated personal hygiene mirror of claim 57 wherein said polarized reflecting surface is a two-way mirror having a reflecting side with a polarizing filter affixed to the surface of said reflecting side and a viewing side.

63. The illuminated personal hygiene mirror of claim 62 further comprising a frame for receiving and supporting said polarized image reflecting surface wherein said frame includes an aperture for receiving said two-way mirror, said reflecting side facing the user and allowing viewing of the cross-polarized light upon the face of the user by a second person through the viewing side.

64. The illuminated personal hygiene mirror of claim 62 wherein a removable cover is releasably insertable into said aperture to cover the viewing side of said two-way mirror when placed in said frame.

65. The illuminated personal hygiene mirror of claim 62 wherein the polarized image reflecting surface is a flat two-way mirror.

66. The illuminated personal hygiene mirror of claim 62 wherein the polarized image reflecting surface is a magnified two-way mirror.

67. The illuminated personal hygiene mirror of claim 57 wherein each of said luminescent diodes has a polarizing filter.

68. The illuminated personal hygiene mirror of claim 57 further comprising a frame for receiving and supporting said polarized image reflection surface wherein said frame has an integrally formed handle.

69. An illuminated personal hygiene mirror comprising:
(a) a polarized image reflecting surface having a first plane of polarization;
(b) a frame for receiving and supporting said polarized image reflecting surface;
(c) a first illumination source comprising a plurality of spaced luminous diodes positioned upon said frame about the periphery of the polarized image reflecting surface, each of said diodes having a polarizing filter having a second plane of polarization; and
(d) a second illumination source comprising a plurality of spaced luminous diodes positioned between diodes of the first illumination source to form an alternating series of diodes about the polarized image reflecting surface;
wherein polarized light falling upon the face of the user from the first illumination source is reflected from the polarized image reflecting surface to the eye of user as cross-polarized light, and non-polarized light falling on the face of the user from the second illumination source is reflected from the polarized image reflecting surface to the eye of the user as polarized light.

70. The illuminated personal hygiene mirror of claim 69 further comprising a switch having a first mode for initiating the first illumination source, a second mode for initiating the second illumination source and a third mode for initiating said first and second sources simultaneously.

71. The illuminated personal hygiene mirror of claim 69 wherein said first illumination source and said second illumination source have different color wavelengths.

72. The illuminated personal hygiene mirror of claim 69 wherein the respective planes of polarization of the first and second planes of polarization are in orthogonal relationship.

73. The illuminated personal hygiene mirror of claim 69 wherein the respective planes of polarization of the first and second planes of polarization may vary in the range of 0 to 90 degrees.

74. The illuminated personal hygiene mirror of claim 69 wherein the polarized image reflecting surface is rotationally positionable within the frame such that the respective planes of polarization of the first and second planes of polarization may be aligned in either a parallel or orthogonal relationship.

75. The illuminated personal hygiene mirror of claim 69 wherein the polarized image reflecting surface is rotationally positionable within the frame such that the respective planes of polarization of the first and second planes of polarization may vary in the range of 0 to 90 degrees.

76. The illuminated personal hygiene mirror of claim 69 wherein said mirror is a two-way mirror having a reflecting side with a polarizing filter affixed to the surface of said reflecting side and a viewing side.

77. The illuminated personal hygiene mirror of claim 69 wherein said frame includes an aperture for receiving said two-way mirror, said reflecting side facing the user and allowing viewing of the cross-polarized light upon the face of the user by a second person through the viewing side.

78. The illuminated personal hygiene mirror of claim 77 wherein a removable cover is releasably insertable into said aperture to cover the viewing side of said two-way mirror when placed in said frame.

79. The illuminated personal hygiene mirror of claim 69 wherein the polarized image reflecting surface is a flat mirror having a polarizing filter affixed to the surface.

80. The illuminated personal hygiene mirror of claim 69 wherein the polarized image reflecting surface is a magnified mirror having a polarizing filter affixed to the surface.

81. The illuminated personal hygiene mirror of claim 69 wherein the polarized image reflecting surface is a variable magnifying mirror having a polarizing filter affixed to the surface.

82. The illuminated personal hygiene mirror of claim 69 wherein said frame has an integrally formed handle.

83. An illuminated personal hygiene mirror comprising:

(a) an image reflecting surface;

(b) a frame for receiving and supporting said image reflecting surface;

(c) a first illumination source comprising a plurality of spaced luminous diodes positioned upon said frame about the periphery of the polarized image reflecting surface, each of said diodes of the first illumination source emitting light of a color of a first wavelength (d) a second illumination source comprising a plurality of spaced luminous diodes positioned between diodes of the first illumination source to form an alternating series of diodes about the polarized image reflecting surface, said diodes of said second illumination source emitting a colored light of a second wavelength; and (e) a switch having a first mode for initiating the first illumination source, and a second mode for initiating the second illumination source.

84. The illuminated personal hygiene mirror of claim 83 wherein said image reflecting surface is polarized.

85. The illuminated personal hygiene mirror of claim 83 wherein said image reflecting surface is polarized with a first plane of polarization and each of the diodes of the first illumination source having a polarizing filter having a second plane of polarization wherein polarized light falling upon the face of the user from the first illumination source is reflected from the polarized image reflecting surface to the eye of user as cross-polarized light, and non-polarized light falling on the face of the user from the second illumination source is reflected from the polarized image reflecting surface to the eye of the user as polarized light.

86. The illuminated personal hygiene mirror of claim 85 wherein the respective planes of polarization of the first and second planes of polarization are in orthogonal relationship.

87. The illuminated personal hygiene mirror of claim 85 wherein the respective planes of polarization of the first and second planes of polarization may vary in the range of 0 to 90 degrees.

88. The illuminated personal hygiene mirror of claim 85 wherein the polarized image reflecting surface is rotationally positionable within the frame such that the respective planes of polarization of the first and second planes of polarization may be aligned in either a parallel or orthogonal relationship.

89. The illuminated personal hygiene mirror of claim 85 wherein the polarized image reflecting surface is rotationally positionable within the frame such that the respective planes of polarization of the first and second planes of polarization may vary in the range of 0 to 90 degrees.

90. The illuminated personal hygiene mirror of claim 85 wherein said image reflecting surface is a two-way mirror having a reflecting side with a polarizing filter affixed to the surface of said reflecting side and a viewing side.

91. The illuminated personal hygiene mirror of claim 90 wherein said frame includes an aperture for receiving said two-way mirror, said reflecting side facing the user and allowing viewing of the cross-polarized light upon the face of the user by a second person through the viewing side.

92. The illuminated personal hygiene mirror of claim 91 wherein a removable cover is releasably insertable into said aperture to cover the viewing side of said two-way mirror when placed in said frame.

93. The illuminated personal hygiene mirror of claim 85 wherein the polarized image reflecting surface is a flat mirror having a polarizing filter affixed to the surface.

94. The illuminated personal hygiene mirror of claim 85 wherein the polarized image reflecting surface is a magnified mirror having a polarizing filter affixed to the surface.

95. The illuminated personal hygiene mirror of claim 85 wherein the polarized image reflecting surface is a variable magnifying mirror having a polarizing filter affixed to the surface.

96. The illuminated personal hygiene mirror of claim 83 wherein said frame has an integrally formed handle.

97. The illuminated personal hygiene mirror of claim 83 wherein said switch has a third mode for integrating said first and second sources simultaneously.

* * * * *